(12) United States Patent
Weber et al.

(10) Patent No.: US 6,170,169 B1
(45) Date of Patent: Jan. 9, 2001

(54) DEVICE FOR DRYING SUBSTRATES

(75) Inventors: Klaus Weber, Bretten; Ulrich Speer, Eisingen, both of (DE)

(73) Assignee: STEAG HamaTech AG (DE)

( * ) Notice: Under 35 U.S.C. 154(b), the term of this patent shall be extended for 0 days.

(21) Appl. No.: 09/424,599

(22) PCT Filed: May 14, 1998

(86) PCT No.: PCT/EP98/02851

§ 371 Date: Nov. 23, 1999

§ 102(e) Date: Nov. 23, 1999

(87) PCT Pub. No.: WO98/53452

PCT Pub. Date: Nov. 26, 1998

(30) Foreign Application Priority Data

May 23, 1997 (DE) .............................................. 197 21 689

(51) Int. Cl.$^7$ ...................................................... F26B 3/39
(52) U.S. Cl. .................................. 34/276; 34/278; 34/66; 34/189; 34/195
(58) Field of Search ............................. 34/275, 276, 278, 34/63, 66, 75, 189, 195; 134/135, 186, 902; 414/936, 941; 118/52, 66, 72

(56) References Cited

U.S. PATENT DOCUMENTS

| | | | |
|---|---|---|---|
| 4,005,135 | * 1/1977 | Helding | 34/278 X |
| 5,249,255 | * 9/1993 | Fuqua et al. | 34/278 X |
| 5,518,542 | * 5/1996 | Matsukawa et al. | 118/52 |
| 5,565,034 | * 10/1996 | Nanbu et al. | 118/668 |
| 5,775,000 | * 7/1998 | Maekawa et al. | 34/58 |
| 6,016,612 | * 1/2000 | Kruwinus | 34/276 |

FOREIGN PATENT DOCUMENTS

| | | |
|---|---|---|
| 40 41 199 | 7/1992 | (DE) . |
| 0 762 409 | 3/1997 | (EP) . |
| 2 606 198 | 5/1988 | (FR) . |
| 58-024235 | 5/1983 | (JP) . |

* cited by examiner

*Primary Examiner*—Stephen Gravini
(74) *Attorney, Agent, or Firm*—Robert W. Becker & Associates

(57) ABSTRACT

A device for drying substrate disks by irradiation with ultraviolet light, wherein during the irradiation process a glass plate is resting on the substrate disk, has a lower part on which the substrate disk rests during drying and a liftable and lowerable upper part for lowering a glass plate onto the substrate disk resting on the lower part. The upper part has a glass plate holding device that is lowered below the substrate disk upon lowering of the upper part for placement of the glass plate onto the substrate disk.

17 Claims, 4 Drawing Sheets

DEVICE FOR DRYING SUBSTRATES

BACKGROUND OF THE INVENTION

The invention relates to a device for drying substrate disks by irradiation with ultraviolet light, wherein during the irradiation process a glass plate rests on the substrate disk.

Such drying devices are especially employed for the manufacture of compact disks or CDs, mini-disks, magneto-optical disks, CD-ROMs, CD-Rs, photo-CDs and/or video disks, and/or digital video disks (DVDs). Especially for the manufacture of substrate disks which are comprised of two partial substrates to be glued together, the glass plates are placed during the drying process onto the substrate disks in order to prevent that the substrate during the drying process will buckle or lose its planar shape. The term drying is to include also the curing of adhesives with which, for example, two substrates are glued to form a substrate disk. The substrate disks to be dried are conventionally positioned on a turntable which rotates in a cycled manner and transports the substrate disks into the drying area of the drying device. Before the substrate disks enter the drying area, the glass plates are placed by a glass plate handling device onto the substrate disks and are removed therefrom after the drying process when the substrate disks have been rotated out of the drying device. By placing the glass plates onto the substrate disks with the aid of a glass plate handling device, it cannot be prevented that non-uniform pressure is applied to the substrate disks. This changes the layer of adhesive positioned between the substrates to be glued which can be changed by pressure in the not yet dried or not yet cured state with respect to its layer thickness. It was found that this causes high reject rates and also considerably impairs the quality of the finished substrate disks.

SUMMARY OF THE INVENTION

The invention has the object to provide a drying device of the aforementioned kind which with simple technical means and simple manipulation of the device provides for reduced reject rates and an improved quality of the finished substrate disks.

This object is inventively solved by a liftable and lowerable upper part which lowers the glass plate onto the substrate disk positioned on a lower part. The placement of the glass plate is performed inventively in the drying device itself so that the time period between placement of the glass plate and start of the drying process is very short. This is very important in regard to the reject rate and the quality of the substrate disk to be manufactured because the adhesive that has been applied uniformly between the two substrates to be glued with high device-technological expenditure will lose its uniform distribution causing variations in the adhesive layer thickness between the substrates to be glued. This results in rejects and reduced quality of the substrate disks. For the uniform application of adhesive layers before the drying process, high expenditures are required. In order not to lose the advantages that can be achieved with a uniform adhesive layer, the inventive device allows to achieve a very short time period between placement of the glass plate and the beginning of the drying process.

According to a further very advantageous embodiment of the invention, the upper part has a glass plate holding device which, upon lowering of the upper part for placement of the glass plate onto the substrate, will drop below it. In this manner the glass plate will be placed onto the substrate disk without additional or non-uniform pressure application so that the pressure of the glass plate across the entire substrate disk surface is very uniform because only the own weight of the glass plate will effect the pressure application. In this manner the aforementioned uniform adhesive layer will be maintained substantially over the entire substrate disk surface area.

Preferably, the glass plate holding device has securing brackets on which edge portions of the glass plate will rest in the lifted state of the upper part. The apparatus configuration for placement of the glass plate onto the substrate disk is thus very simple and realized with especially simple means because the position of the securing brackets and thus the securing and lowering of the glass plate can be adjusted with simple means.

The securing brackets are preferably reflective surfaces, for example, by being polished to high luster. Accordingly, they reflect the ultraviolet radiation especially in the area of the substrate disk to be dried in a suitable manner so that the critical edge drying process is thus improved and accelerated. Since the securing brackets after placement of the glass plate onto the substrate disk are positioned below the substrate disk, the positioning of these securing brackets below the substrate disk makes it possible that the ultraviolet light impinging from above can also be directed onto the lower edge portion of the substrate disk.

According to a further very advantageous embodiment of the invention, the glass plate delimits an irradiation chamber for the substrate disk in the upward direction. The glass plate thus forms a closure wall for the irradiation chamber which is especially advantageous when the drying device, according to a further embodiment, has a gas inlet device for introducing a gas to displace the air in the treatment chamber, for example, for introducing nitrogen. The displacement of the air contained in the treatment chamber prevents the oxygen contained therein from reacting to oxygen peroxide by exposure to the intensive UV radiation. Oxygen peroxide strongly absorbs UV radiation and will hinder and delay the drying process. With the inventive liftable and lowerable upper part of the drying device it is possible to place the glass plate not only onto the substrate disk but, alternatively, also at a desired spacing from the substrate disk so that between glass disk and glass plate the air contained therebetween can be displaced by the introduced gas. The drying process can thus be improved or accelerated over the entire surface area of the substrate disk. It is also possible with the inventive device to change quickly and without additional expenditure the type of drying process for the substrate disk, i.e., to place the glass plate completely onto the substrate disk or to maintain the glass plate at a selected spacing above the substrate disk during the drying process.

According to a further advantageous embodiment of the invention spacers are provided between the glass plate and the substrate. The spacer can be provided on the glass plate holding device so that the glass plate cannot be placed onto the substrate disk. Because of the spacer which has a desired thickness corresponding to the desired spacing between glass plate and substrate disk, it is thus also possible, simply by placing the spacers onto the glass plate holding device, to change the inventive device from the operational mode with contacting glass plate to the operational mode with intermediate space between the glass plate and the substrate disk.

According to an advantageous embodiment of the invention, a rotating device is provided which rotates or pivots the upper part in its lifted position into and out of the irradiation chamber. The rotation device is preferably integrated into a lifting device for lifting and lowering the upper part or is combined with a lifting device so that the drive device for the glass plate handling device is compact and of a simple configuration.

Preferably, the rotation device has a turntable with multiple upper parts. It is thus possible to transport the glass plates heated during the previous drying process into a cooling station provided according to a further embodiment of the invention. The cooling station thus cools the glass plates not positioned within the irradiation chamber for the drying process so that they will reach a similar temperature as that of the substrate disk for placement onto a substrate disk for a further drying process. When the temperature difference between the deposited glass plate and the substrate disk is substantial, an impairment of the product quality of the substrate disks results and the reject rate increases.

An advantageous embodiment of the invention is characterized in that the turntable has four upper parts whereby two upper parts are respectively positioned in the irradiation chamber of the drying device and two other upper parts are positioned in the cooling station. In this embodiment the turntable is thus rotated by 180°. Subsequently, the two upper parts positioned above the lower parts are simultaneously lowered onto the substrate disks. The drying process thus is carried out simultaneously for two substrate disks in the drying device.

As a cooling medium a suitable fluid can be used. Advantageously, ionized air is used in this context which is blown into the cooling station and then flows past the glass plates to be dried.

A further advantageous embodiment of the invention is realized by designing the lower part of the drying device as a placement plate for the substrate disks which can be rotated. In this manner the substrate disks placed onto the plate are exposed within the irradiation chamber uniformly to the irradiation conditions and a uniform and quick drying or curing of the adhesive takes place so that the product quality is further improved.

BRIEF DESCRIPTION OF THE DRAWINGS

The invention is explained in the following with the aid of preferred embodiments with reference to the figures.

It is shown in.

DESCRIPTION OF THE PREFERRED EMBODIMENTS

Figure 1:
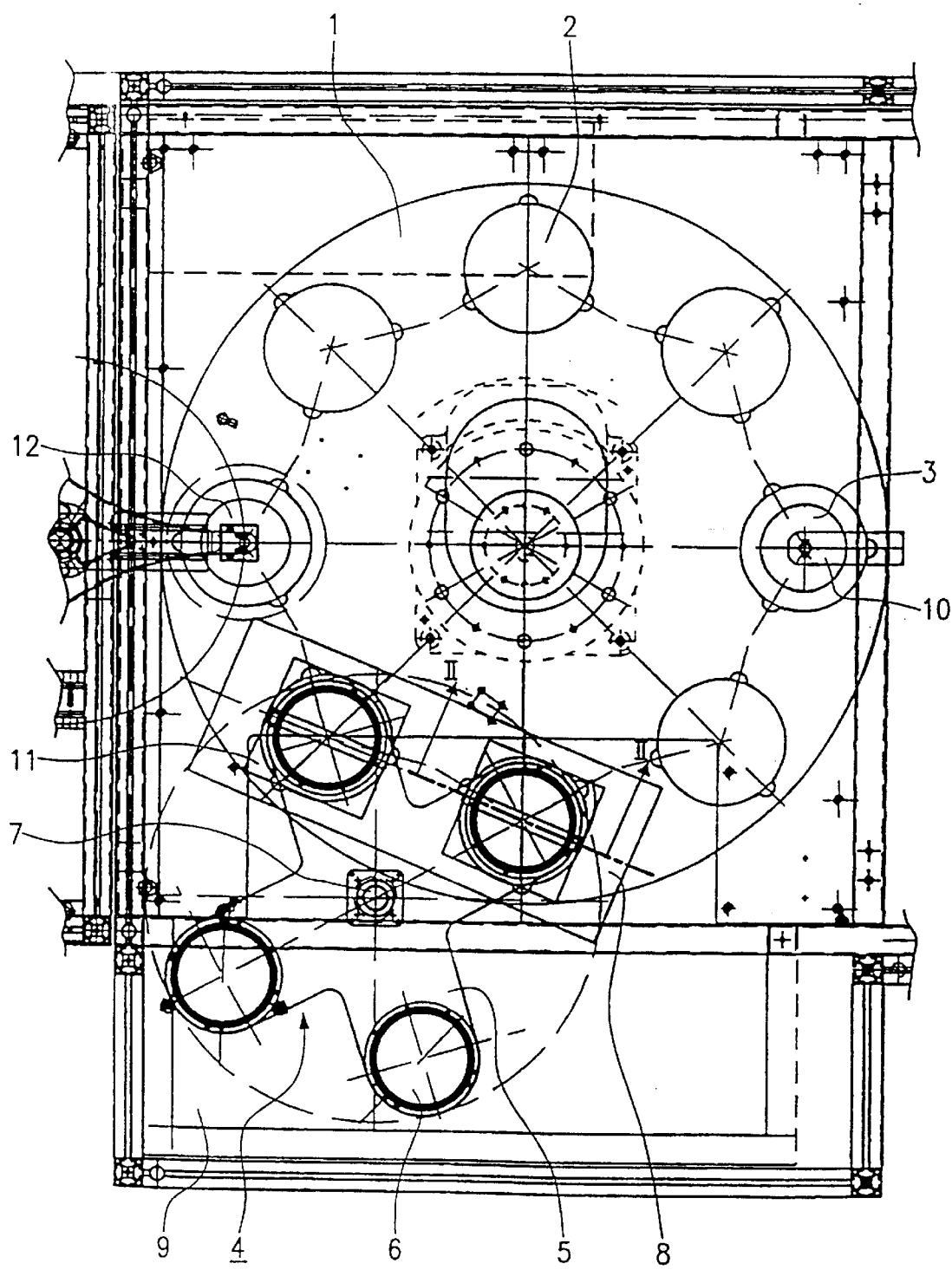
FIG. 1 a schematic representation of the inventive drying device in a plan view.

The represented embodiment of the drying device according to FIG. 1 has a turntable 1 with eight placement positions 2 for the substrate disks 3 to be dried. A glass handling device 4 has four arms 5 having at its ends respectively an upper part 6 of the drying device. The glass handling device 4 is secured centrally on a column 7 which can be rotated and pivoted as well as lifted or lowered. An irradiation station 8 is positioned in the area of two placement positions 2 and a cooling station 9 is provided in the area of the upper parts 6 not positioned within the irradiation station 8.

The substrate disks 3 to be dried which have been glued together in a previous manufacturing step from two substrates, are placed by a substrate handling device 10 onto placement positions 2 of the turntable 1. In order to avoid repetitions with respect to the manufacturing steps preceding or following the drying step, reference is made to the German published patent document 197 18 471 with filing date of Apr. 30, 1997 which was not published as of the filing date of this application and which is owned by the instant applicant.

The turntable 1 is rotated stepwise in a clockwise direction about an angle of 45° so that two substrate disks 10 are respectively positioned in the irradiation station 8. Then the glass handling device 4 is rotated by 180° so that a glass disk 11 can be respectively placed onto the substrate disks 10 in the irradiation station 8. Since this rotational movement transports two other glass disks 11 into the cooling station 9, they can be cooled therein, for example, by ionized air.

After leaving the irradiation station 8 the dried substrate disks 10 are then gripped by a further handling device 12 and removed from the drying device.

Figure 2:
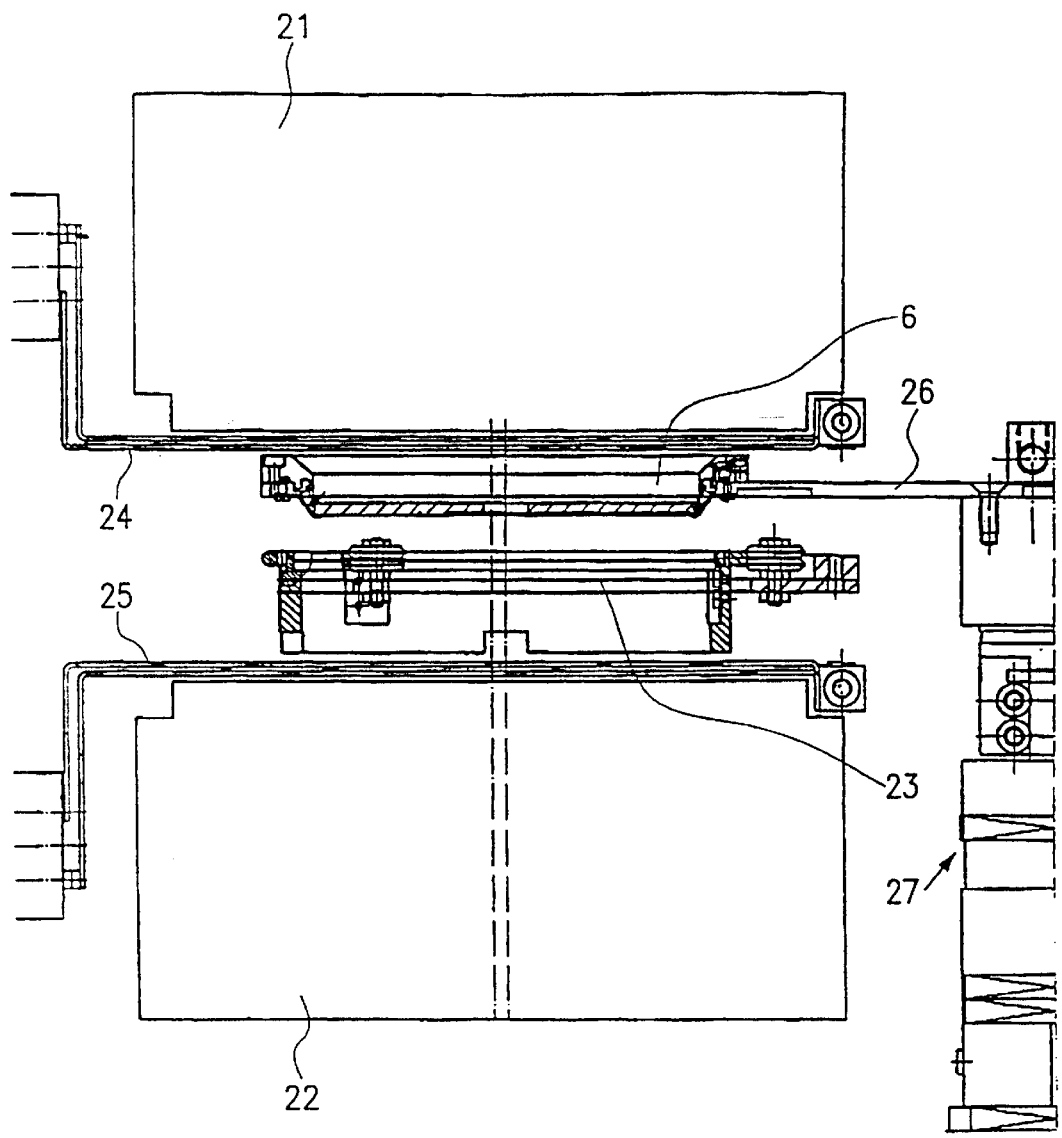
FIG. 2 a cross-section along the section line II—II shown in FIG. 1 with the upper part in the lifted position.

As can be seen especially in FIG. 2, the irradiation station 8 has upper UV lamps 21 and lower UV lamps 22 between which the upper part 6 and a lower part 23 are arranged. A closure 24 under the upper UV lamp 21 and a closure 25 above the lower UV lamp 22 allow for a controlled UV irradiation of the substrate disk 10 supported by the lower part 23.

While the lower part 23 is stationary, the upper part 6 is connected by arm 26 to a combined rotation and lifting device 27 which is schematically represented in FIG. 2 in a part-sectional view. It lifts the upper part 6 and lowers it, and also rotates or pivots it in a plane perpendicular to the drawing plane out of the irradiation chamber 28.

Figure 3:
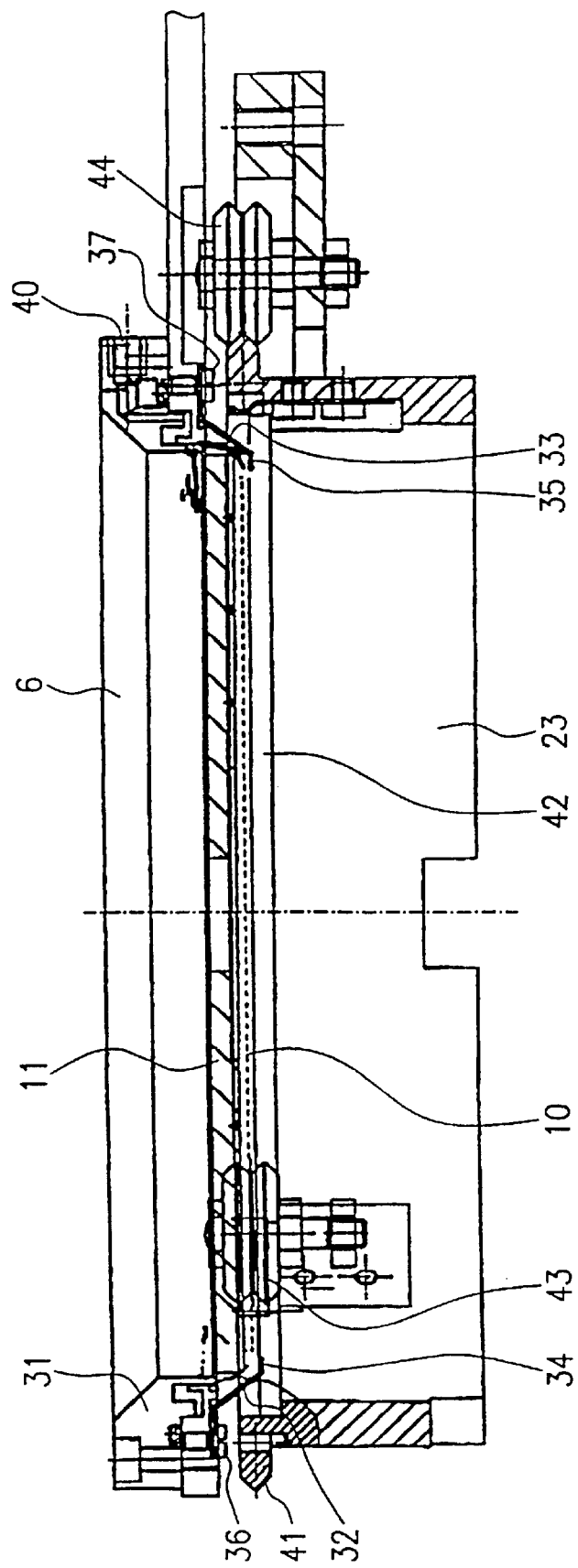
FIG. 3 an enlarged cross-sectional representation of the upper and lower parts with lowered upper part.

FIG. 3 shows an enlarged detail of the device of FIG. 2 with the upper part 6 and the lower part 23 in a state in which the upper part 6 is lowered onto the lower part 23.

The upper part 6 has a rectangular frame. At the underside of the upper part 6 a respective glass plate holding device 32, 33 is positioned at least at the lateral frame parts 31. In the shown embodiment the holding devices 32, 33 are curved sheet metal parts with a receiving edge 34, 35 for placing thereon the glass plate 11. The glass plate holding device 32, 33 is fastened by screws 36, 37 onto the underside of the upper part 6.

When the upper part 6 is lifted (see FIG. 2), the glass plate 11 is resting with its edge areas on the edges 34, 35 of the glass plate holding device 32, 33; upon lowering of the upper part 6, the glass plate 11 will come free of the edges 34, 35 because the edges 34, 35 are lowered to such an extent that the glass plate 11 during lowering of the upper part 6 will come to rest on the substrate disk 10 (shown in FIG. 3 in dashed lines). The glass plate 11 is thus softly placed onto the substrate disk 3 and applies pressure uniformly with its own weight so that the substrate disk will maintain the substrate disk 3 in a flat and planar position during the drying process following directly after placement of the glass plate 11.

As can be seen best in FIG. 3, at the frame 31 of the upper part 6 a gas inlet device 40 is provided via which, for example, nitrogen can be introduced into the irradiation chamber. In the embodiment represented in FIG. 3, the glass plate 11 rests on the substrate disk 3. When it is desired to provide an intermediate space between the glass plate and the substrate disk, and when in this intermediate space the air is to be displaced by nitrogen to remove the disadvantageous oxygen for the drying device, the upper part 5 is lowered at least to such an extent that a desired intermediate space between the glass plate 11 and the substrate disk 3 is maintained. In this case, the glass plate 11 will come to rest on the edge 34, 34 of the glass plate holding device 32, 33 and is maintained in this position during the drying process.

In the represented embodiment the lower part 23 has a placement plate 41 with a glass plate 42 on which the substrate disk 3 rests. The placement plate 41 is rotatable and guided in its position by rollers 43, 44, 45. In the shown embodiment, three rollers 43, 44, 45 are displaced relative to one another by an angle of 120° whereby in FIG. 1 only two rollers 43, 44 are shown.

Figure 4:
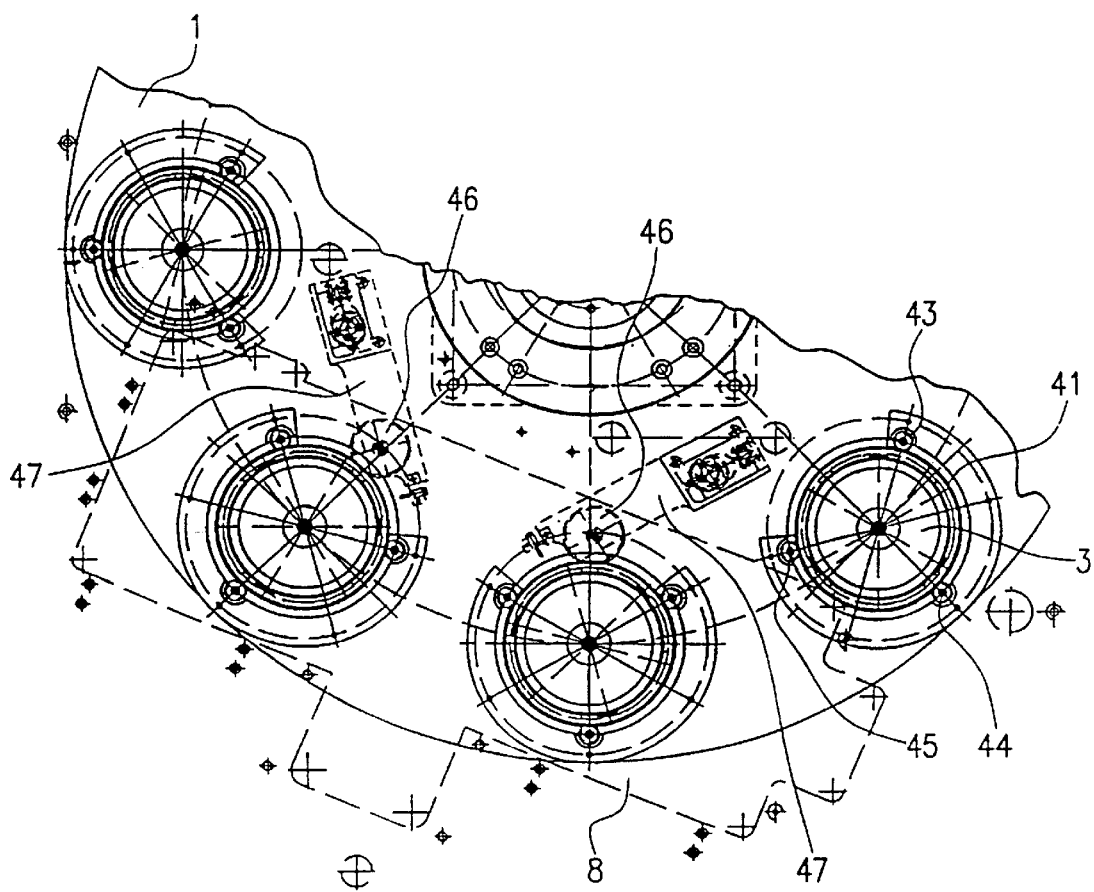
FIG. 4 a part sectional view of the represented embodiment in a plan view for illustrating the devices for rotating the placement plates in the irradiation station 8.

FIG. 4 shows a section of the turntable 1 with placement plates 41 which are supported and guided at their edges by the staggered rollers 43, 44, 45 displaced relative to one another by 120°. When upon rotation of the turntable 1 in the clockwise direction the placement plate 41 with substrate disk 3 positioned thereon is moved into the irradiation station 8, the edge of the placement plate 41 will contact one of the driven drive rollers 46 positioned at the end of support arm 47. During the drying process the placement plate 41 and thus also the substrate disk 3 are rotated, optionally together with the glass plate 11 positioned on the substrate disk 3, so that a uniform and fast drying and curing of the substrate disk, respectively, of the adhesive results. In order to facilitate the representation, the glass handling device 4 is not represented in the view of FIG. 4.

The invention has been disclosed with the aid of a preferred embodiment. However, to a person skilled in the art further embodiments and deviations are possible without leaving the gist of the invention. For example, for transporting the substrate disks to be dried into a position underneath the irradiation station 8, it is possible to use a linear transporting device instead of the turntable 1.

The present invention is, of course, in no way restricted to the specific disclosure of the specification and drawings, but also encompasses any modifications within the scope of the appended claims.

What is claimed is:

1. A device for drying substrate disks (3) by irradiation with ultraviolet light, wherein during the irradiation process a glass plate (11) is resting on the substrate disk (3), said device comprising:

a lower part (23) on which a substrate disk (3) rests during drying;

a liftable and lowerable upper part (6) for lowering a glass plate (11) onto the substrate disk (3) resting on said lower part (23);

said upper part (6) comprising a glass plate holding device (32, 33) configured to be lowered below the substrate disk (3) upon lowering of said upper part (6) for placement of the glass plate (11) onto the substrate disk (3).

2. A device according to claim 1, wherein said glass plate holding device (32, 33) has securing brackets (34, 35) configured to support edge portions of the glass plate (11) in the lifted position of said upper part (6).

3. A device according to claim 1, wherein at least portions of said glass plate holding device (32, 33) are reflective surfaces for reflecting the ultraviolet radiation.

4. A device according to claim 1, wherein the glass plate (11) delimits an irradiation chamber for the substrate disk (3) in the upper direction.

5. A device according to claim 4, comprising a gas inlet device (40) for introducing a gas to displace the air in the irradiation chamber.

6. A device according to claim 5, wherein the gas is nitrogen.

7. A device according to claim 6, comprising spacers positioned between the glass plate (11) and the substrate disk (3).

8. A device according to claim 7, wherein said spacers are monolithic with the glass plate (11).

9. A device according to claim 1, comprising a glass handling device (4) for handling the glass plates (11).

10. A device according to claim 9, wherein said glass handling device (5) comprises a rotation device (27).

11. A device according to claim 10, comprising a lifting device connected to said upper part (6) for lifting and lowering said upper part (6), wherein said rotation device (27) and said lifting device for lifting and lowering the upper part (6) are combined to a single unit.

12. A device according to claim 10, wherein said rotation device (27) comprises a plurality of arms (5), each one of said arms provided for a respective one of said upper parts (6).

13. A device according to claim 10, comprising a cooling station (9) for cooling the glass plates (11) heated during the drying process.

14. A device according to claim 13, wherein said rotation device (27) has four of said upper parts (6), wherein two of said upper parts are positioned in an irradiation station (8) and two of said upper parts are positioned in said cooling station (9).

15. A device according to claim 14, wherein a cooling medium in said cooling station is ionized air.

16. A device according to claim 1, wherein said lower part (23) has a placement plate (41) for the substrate disk (3).

17. A device according to claim 16, wherein said placement plate (41) is configured to rotate.

* * * * *